United States Patent
Aggarwal et al.

(10) Patent No.: US 10,805,753 B2
(45) Date of Patent: Oct. 13, 2020

(54) MULTI-CHANNEL AUDIO OVER A WIRELESS NETWORK

(71) Applicant: Caavo Inc, Milpitas, CA (US)

(72) Inventors: Ashish D. Aggarwal, Stevenson Ranch, CA (US); Karthik Shrinarsi, Bangalore (IN); Vinod K. Gopinath, Bangalore (IN); Neha Mittal, New Delhi (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 16/558,737

(22) Filed: Sep. 3, 2019

(65) Prior Publication Data

US 2019/0394597 A1    Dec. 26, 2019

Related U.S. Application Data

(62) Division of application No. 15/354,449, filed on Nov. 17, 2016, now Pat. No. 10,440,491.

(60) Provisional application No. 62/256,223, filed on Nov. 17, 2015.

(51) Int. Cl.
| | |
|---|---|
| *H04S 7/00* | (2006.01) |
| *H04R 5/04* | (2006.01) |
| *H04S 3/00* | (2006.01) |
| *H04L 1/00* | (2006.01) |
| *H04L 29/06* | (2006.01) |

(52) U.S. Cl.
CPC ............. *H04S 7/30* (2013.01); *H04L 1/00* (2013.01); *H04L 65/4092* (2013.01); *H04L 65/80* (2013.01); *H04R 5/04* (2013.01); *H04S 3/008* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 6,785,262 B1 | 8/2004 | Yao et al. | |
| 2004/0071084 A1 | 4/2004 | El-hennawey et al. | |
| 2007/0038999 A1* | 2/2007 | Millington | H04J 3/0664 718/100 |
| 2007/0214229 A1* | 9/2007 | Millington | H04L 69/28 709/208 |
| 2007/0226530 A1* | 9/2007 | Celinski | G06F 1/12 713/500 |

(Continued)

*Primary Examiner* — Paul W Huber
(74) *Attorney, Agent, or Firm* — Fiala & Weaver P.L.L.C.

(57) ABSTRACT

Embodiments described herein reduce latency and improve packet delivery when transmitting audio packets from a source device to one or more sink devices. For example, one or more operating modes that introduce latency when transmitting packets may be disabled at the source device and/or sink device(s). Additionally, certain operational behavior of the source device and/or sink device(s) may be changed based on the quality of the channel used to transmit audio packets to further improve the latency. Such operational behavior includes changing the jitter buffer size of the sink device(s), the number of retry attempts performed by the source device when re-transmitting packets that have been lost, and changing the channel used to transmit the audio packets. Embodiments described herein further enable the synchronization of playback between the sink devices to ensure that sink devices playback audio packets in a synchronized fashion.

20 Claims, 8 Drawing Sheets

(56) References Cited

U.S. PATENT DOCUMENTS

| | | | |
|---|---|---|---|
| 2007/0263653 A1 | 11/2007 | Hassan et al. | |
| 2009/0262709 A1 | 10/2009 | Mason et al. | |
| 2011/0176060 A1 | 7/2011 | Lee et al. | |
| 2013/0268980 A1* | 10/2013 | Russell | H04N 21/4122 |
| | | | 725/75 |
| 2013/0336499 A1 | 12/2013 | Beckhardt et al. | |
| 2014/0323036 A1* | 10/2014 | Daley | H04H 20/08 |
| | | | 455/3.06 |
| 2015/0016283 A1 | 1/2015 | Lyle et al. | |
| 2015/0067521 A1* | 3/2015 | Heo | G06F 3/1446 |
| | | | 715/733 |
| 2015/0179227 A1* | 6/2015 | Russell | H04N 21/4122 |
| | | | 386/201 |
| 2015/0319556 A1* | 11/2015 | Chen | H04W 56/00 |
| | | | 455/41.3 |
| 2016/0262120 A1* | 9/2016 | Shani | H04W 40/244 |
| 2017/0063704 A1 | 3/2017 | Krinsky | |
| 2017/0142535 A1 | 5/2017 | Aggarwal et al. | |

\* cited by examiner

MULTI-CHANNEL AUDIO OVER A WIRELESS NETWORK

CROSS-REFERENCE TO RELATED APPLICATIONS

This application is a divisional application of U.S. patent application Ser. No. 15/354,449, filed on Nov. 17, 2016, which claims priority to U.S. Provisional Application No. 62/256,223, filed Nov. 17, 2015, the entireties of which are incorporated herein.

BACKGROUND

Technical Field

The subject matter described herein relates to the transmission of audio via a wireless communication channel.

Description of Related Art

Traditional multi-channel surround sound systems use wires to carry the audio signal from the amplifier/receiver device to a plurality of speakers (e.g., six speakers in a 5.1 system). This type of set up is not subject to external interference because it is a closed system, and it also has the inherent advantage of keeping all the speakers in sync with each other, as they all play the audio almost instantaneously and in harmony with each other.

However, the convenience associated with not having to run wires across the room make for a compelling reason to build a wireless system without the associated problems traditionally associated with these systems.

Multi-channel wireless audio systems can use proprietary wireless hardware and protocols or use standard Wi-Fi-enabled apparatuses (e.g., access points) to deliver audio to speakers wirelessly from a source device (e.g., an audio/video receiver). Proprietary wireless hardware was the preferred method in the past because wireless standards such as Institute of Electrical and Electronics Engineers (IEEE) 802.11 were originally designed to carry data packets without requiring isochronous timing. Hence, in order to maintain strict timing required to send audio, vendors began to build hardware solutions that deviated from the Wi-Fi standard to provide the required timing, thereby making every solution proprietary.

BRIEF SUMMARY

Methods, systems, and apparatuses are described for the transmission of audio via a wireless communication channel, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
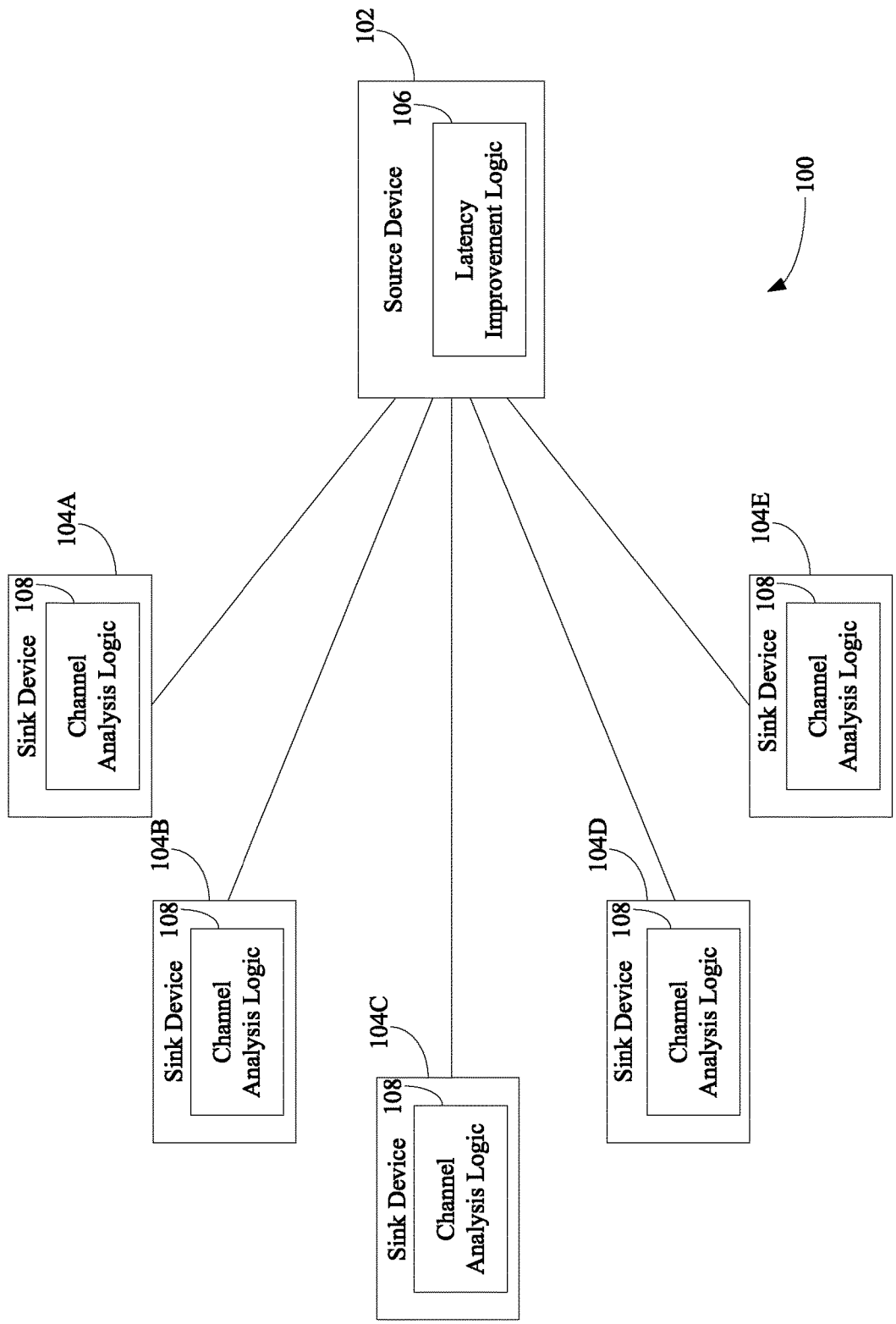
FIG. 1 is a block diagram of a system that is configured to reduce latency when transmitting audio in accordance with a wireless communication protocol in accordance with an embodiment.

Embodiments will now be described with reference to the accompanying drawings.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

A method for reducing latency for transmission of audio packets between a source device and one or more sink device over a wireless network is described herein. Latency is the delay from the time the audio is transmitted to the time it starts playing out on the receiver (e.g., a speaker); the lower the latency the better. In accordance with the method, one or more operating modes of at least one of the source device and the one or more sink devices are disabled. A quality of a first channel of the wireless network in which audio packets are transmitted to at least one sink device of the one or more sink devices is determined to be below a predetermined threshold. In response to determining that the quality is below the predetermined threshold, at least one of the following is performed: a buffer size of a jitter buffer of the one or more sink devices is increased, a number of times at which transmission of the audio packets to the one or more sink devices are retried is increased, and a second channel in which the audio packets are to be transmitted to the one or more sink devices is determined.

A system is also described herein. The system includes one or more processors and a memory containing computer-readable instructions, which, when executed by the one or more processors, is configured to perform operations in a source device configured to transmit audio packets to one or more sink devices via a wireless network. In accordance with the operations, one or more operating modes of at least one of the source device and the one or more sink devices are disabled. A quality of a first channel of the wireless network in which audio packets are transmitted to at least one sink device of the one or more sink devices is determined to be below a predetermined threshold. In response to determining that the quality is below the predetermined threshold, at least one of the following is performed: a buffer size of a jitter buffer of the one or more sink devices is increased, a number of times at which transmission of the audio packets to the one or more sink devices are retried is increased, and a second channel in which the audio packets are to be transmitted to the one or more sink devices is determined.

A method for synchronizing playback of audio packets by a plurality of sink devices is further described herein. In accordance with the method, a beacon signal from a source device is received by each of the plurality of sink devices, the beacon signal including timing information and a first timing parameter. Each of the plurality of sink devices adjusts a receiver clock signal used to play back audio packets received by the source device based on the timing information and the first timing parameter

II. Transmitting Audio Via a Wireless Communication Channel

As available bandwidth grows with newer standards, such as IEEE 802.11b, 802.11g, 802.11n, 802.11ac, it is becoming more feasible to work with standard Wi-Fi enabled devices to deliver wireless multi-channel audio with satisfactory latency and jitter. To achieve this, several challenges must be overcome.

One challenge is handling interference from other Wi-Fi networks. Because Wi-Fi channels are using a common medium in an unlicensed band, there is always the possibility of other networks using this same band/channel, which causes interference, and therefore, delays.

Another challenge is handling interference from other sources. Interference from non-Wi-Fi networks/devices (e.g., Bluetooth networks, microwave ovens, cordless phones etc.) is common. All these networks/devices use the same channels, and therefore, can cause interference.

Yet another challenge is handling interference due to fading (e.g., multipath fading effects). Even if there are no other networks, physical obstructions or room dimensions may lead to multipath fading effects, which can cause destructive interference and result in a lost signal at the receiving device.

Another challenge is handling infrastructure-induced latency. In a typical infrastructure, Wi-Fi network stations communicate with each other via a central access point (AP). This adds an unnecessary hop in the network that adds to the latency.

Yet another challenge is handling jitter buffer-induced latency. In order to reduce the jitter (i.e., variable delay) of audio packets, receivers (also referred to as "stations" or "STAs") tend to include buffers that store a few audio packets before starting the play-out of audio. This introduces an artificial latency into the system.

Another challenge is handling the power-save induced latency. Many devices are expected to be powered by a battery and hence, utilize power-save mechanisms available to them as part of the Wi-Fi standard. While station(s) are asleep, the AP buffers the packets that are meant for them and sends them as bursts when the station(s) awake. This behavior can introduce significant latencies in the system.

Yet another challenge is handling the impact of using Wi-Fi for audio delivery. There are four primary factors that determine the quality of audio delivery: the bit-rate of the audio transmitted, the latency, the jitter, and speaker synchronization. The bit-rate is the number of bits used to represent a certain instance of audio. Typical rates are 8, 16, 24 bits, etc. at 48/96/192 kHz. Generally, the more bits there are to transfer, the better the sampling accuracy and the quality of sound. Of course, the larger the number of bits, the larger amount of bandwidth is needed. This is typically an issue when there is video associated with the audio. Latencies can cause lip sync issues. Latencies can also be created artificially to reduce jitter. As long as the latencies are within a finite limit, they are acceptable. A latency of 20 ms between video and audio is normally acceptable. With respect to jitter, audio transfer is expected to be isochronous. This means that every new packet has to arrive at a fixed predetermined time after the previous packet so that there is no break in audio. Because the wireless channel is inherently prone to noise and is a shared medium, jitter needs to be effectively mitigated to ensure break-free audio. With respect to speaker synchronization, in typical stereo systems, audio is transmitted to connected speakers over a wire at the same time. However, in a wireless channel it is possible that when unicast delivery methods are used, audio packets can reach each speaker at slightly different times. The playback of these packets need to be perfectly synchronized across all the speakers, which means that all the speakers should have their clocks synchronized.

Techniques described herein overcome the challenges described above.

In particular, embodiments described herein reduce latency and improve packet delivery when transmitting audio packets from a source device to one or more sink devices. For example, one or more operating modes that introduce latency when transmitting packets may be disabled at the source device and/or sink device(s). Additionally, certain operational behavior of the source device and/or sink device(s) may be changed based on the quality of the channel used to transmit audio packets to further improve the latency. Such operational behavior includes changing the jitter buffer size of the sink device(s), the number of retry attempts performed by the source device when re-transmitting packets that have been lost, and changing the channel used to transmit the audio packets. Embodiments described herein further enable the synchronization of playback between the sink devices to ensure that sink devices playback audio packets in a synchronized fashion.

Subsection II.A describes embodiments that are used to reduce latency and improve packet delivery when transmitting audio packets. Subsection II.B describes embodiments that are directed to synchronizing playback between sink devices.

A. Latency Reduction and Improved Packet Delivery

FIG. 1 is a block diagram of a system 100 that is configured to reduce latency when transmitting audio in accordance with a wireless communication protocol in accordance with an embodiment. As shown in FIG. 1, system 100 includes a source device 102 and a plurality of sink devices 104A-104E. Source 102 and sink devices 104A-104E may be communicatively coupled via a wireless local area network. Accordingly, source device 102 is configured to provide audio packets to sink device 104A-104E in accordance with a wireless communication protocol. The audio packets are to be played back via sink devices 104A-104E, such that audio signal(s) is/are reproduced by sink devices 104A-104E as sound. Examples of source device 102 include, but are not limited to, a Blu-ray player, a video game console, a set-top box (such as a cable TV set-top box, a satellite TV set-top box, etc.), an A/V receiver, and/or the like. Examples of sink devices 104A-104E include a loudspeaker configured to wirelessly receive audio packets in accordance with a wireless communication protocol. It is noted that while FIG. 1 shows that system 100 includes five sink devices 104A-104E, system 100 may include any number of sink devices that are communicatively coupled to source device 102.

Examples of a wireless communication protocol include, but are not limited to a Wi-Fi-based protocol (i.e., any protocol based on the IEEE 802.11 standard). In accordance with an embodiment, source device 102 transmits and sink devices 104A-104E receive audio packets in accordance with the IEEE 802.11n/ac standards, which provide up to 300/400 Mbps (2 streams at 40 MHz) of raw throughput. The IEEE 802.11 ac standard uses multi-user multiple-input and multiple-output (MU-MIMO) technology, which may be used to simultaneously transmit two streams (e.g., in an embodiment in which two source devices are used) at the same time, thereby further increasing the available bandwidth. This advantageously enables audio requiring large bandwidth (e.g., high-definition audio) to be wirelessly transmitted to sink devices 104A-104E. For example, a typical compact disc (CD) is recorded at 44 kHz, 16 bits per channel, which requires approximately 1.4 Mbps of data to be transmitted uncompressed. This does not include all the headers, management frames, retransmission and other overheads associated with the Wi-Fi protocol. In the case of a Blu-ray disc, Dolby TrueHD (an optional codec) may carry up to eight discrete audio channels of 24-bit audio at 96 kHz, leading to a maximum encoded bit rate of 18 Mbps.

Other IEEE standards, such as 802.11 b/g, allow for up to a maximum raw data rate of 54 Mbps, thereby making it feasible to send Dolby TrueHD audio over the air assuming that there are no other wireless networks or transmissions or interference at 2.4 GHz. However, this assumption is impractical, and hence the 802.11n/ac standards may be used to ensure that enough bandwidth is available to transmit audio packets carrying high-definition audio.

Source device 102 may include (e.g., be integrated with) a transmitter (e.g., an antenna) that is configured to wirelessly transmit audio packets to sink devices 104A-104E. This advantageously results in lower latency when transmitting audio packets to sink devices 104A-104E than when compared to conventional techniques that use a separate access point coupled to source device 102 for wireless transmission. In particular, the latency involved with providing the audio packets to the external access point and processing the audio packets by the external access point are removed. In accordance with an embodiment, source device 102 and sink devices 104A-104E are communicatively coupled via a Wi-Fi Direct protocol.

As shown in FIG. 1, source device 102 includes latency improvement logic 106, and each of sink devices 104A-104E includes channel analysis logic 108. Latency improvement logic 106 may be configured to reduce the latency when transmitting audio packets to sink devices 104A-104E. Channel analysis logic 108 may be configured to determine the quality of the wireless channel (e.g., a Wi-Fi channel) used to receive audio packets from source device 102. Latency improvement logic 106 may be configured to reduce the latency based on the quality of the wireless channel as determined by channel analysis logic 108.

The following subsections describe various techniques to reduce the latency in transmitting audio packets to sink devices 104A-104E.

a. Power Save Mode

Wireless communication protocol standards (e.g., IEEE 802.11-based standards) may support a power save mode that enables a device to enter a power-off state or a low-power state (e.g., a standby or sleep state) after the device experiences a predetermined period of inactivity.

In an embodiment in which sink devices 104A-104E form a multi-channel speaker system, it is reasonable to expect that sink devices 104A-104E will be actively powered via a wall power outlet while in operation, thereby making the need for power-save operations much less of an issue. Thus, in accordance with an embodiment, the power save mode is disabled for sink devices 104A-104E while in operation (e.g., after sink devices 104A-104E have been powered on) to prevent any increase in latency attributable to the power save mode. In accordance with an embodiment, sink devices 104A-104E may be configured to disable the power save mode by default upon being power on. In accordance with another embodiment, source device 102 is configured to transmit a message to sink devices 104A-104E that causes sink devices 104A-104E to disable the power save mode.

b. Stack Overhead

Another cause for latency arises from (i) audio packets traversing a multi-layer network stack implemented by source device 102 before being transmitted to sink devices 104A-104E via one or more drivers (e.g., media access control (MAC) driver(s)) of source device 102; and (ii) audio packets traversing a multi-layer network stack implemented by sink devices 104A-104E in the reverse order. In particular, when traversing a multi-layer network stack implemented by source device 102, audio packet(s) first go through an application layer followed by a transport layer (e.g., a Transmission Control Protocol (TCP)/User Datagram Protocol (UDP) layer), a network layer (e.g., an Internet Protocol (IP) layer), a data link layer (e.g., a Media Access Control (MAC) layer) and a physical layer. When traversing a multi-layer network stack implemented by sink devices 104A-104E, audio packet(s) first go through the physical layer, followed by the data link layer, the network layer, the transport, and the application layer.

In accordance with an embodiment, one or more layers of the multi-layer network stack are bypassed to reduce the latency associated therewith when transmitting audio packets and receiving audio packets. For example, when transmitting audio packets, the audio packets may be provided from the application layer directly to the data link layer, thereby bypassing the transport layer and network layer. Audio packet(s) may be passed from the application layer to the data link layer using raw sockets. With raw sockets, the kernel of the operating system executing on source device 102 directly provides the data to the MAC driver(s) implemented at the data link layer, thereby bypassing the transport layer and the network layer. Latency improvement logic 106 may further format the audio packet(s) such that the TCP/UDP and IP headers of the audio packets are removed and the MAC header (containing the MAC address of the sink device (e.g., sink devices 104A-104E)) is maintained. By doing so, the audio packets, when received by the sink device, are ignored by transport layer and network layer of the multi-layer network stack implemented by the sink device and only processed by the data link layer of the multi-layer network stack.

c. Jitter Buffer

A jitter buffer uses the concept of "pre-buffering" to smoothen the inter-packet timing variations. A large jitter buffer effectively takes care of larger variations in timing, but a large buffer has the disadvantage of adding to the latency (and ultimately, introducing lip-sync issues) and requiring more memory. To reduce the latency and jitter, an optimal size of the jitter buffer implemented by each of sink devices 104A-104E is dynamically determined by latency improvement logic 106. In accordance with an embodiment, latency improvement logic 106 determines the jitter buffer size based on a determined quality of the wireless channel of the wireless communications network used to receive audio packets. For example, channel analysis logic 108 of each of sink devices 104A-104E may determine various characteristics of the channel between its sink device and source device 102. Such characteristics may include, but are not limited to, the latency from when source device 102 transmits the audio packet and when the targeted sink device receives the audio packet, the number of audio packets that have been dropped or lost, and/or the difference between the audio packet's expected arrival time at the target sink device and the actual arrival time at the targeted sink device. Channel analysis logic 108 of each of sink devices 104A-104E provides the determined characteristics (e.g., via a message) to source device 102. Latency improvement logic 106 may compare the characteristics received from each of sink devices 104A-104E to a predetermined threshold and determine which set of characteristics from a particular sink device is the most below the predetermined threshold (i.e., latency improvement logic 106 determines which of sink devices 104A-104E is suffering from the poorest channel quality). Latency improvement logic 106 may determine the jitter buffer size for each of sink devices 104A-104E based on the sink device experiencing the worst channel quality. For example, the jitter buffer implemented by each of sink devices 104A-104E may be increased, where a poorer channel quality corresponds to a greater jitter buffer size. After determining the jitter buffer size, latency improvement logic 106 transmits the determined jitter buffer size to each of sink devices 104A-104E, and each of sink devices 104A-104E increases the size of its jitter buffer such that each jitter buffer is set to the same increased size. Latency improvement logic 106 may determine that the jitter buffer size is to be decreased in the event that the channel quality for that particular sink device improves.

In accordance with an embodiment, channel analysis logic 108 of each of sink devices 104A-104E may determine the size of its associated jitter buffer instead of latency improvement logic 106. In accordance with such an embodiment, channel analysis logic 108 may increase or decrease its associated jitter buffer and/or provide an indication to latency improvement logic 106 of the updated size. Latency improvement logic 106 may compare the jitter buffer size received from each of sink devices 104A-104E and determine which jitter buffer size is the largest. Latency improvement logic 106 may then transmit a message to each of sink devices 104A-104E with the determined largest size, and each of sink devices 104A-104E may update its jitter buffer size accordingly.

d. Retry Count

Wireless communication protocol standards (e.g., IEEE 802.11-based standards) may include a mechanism for sink devices 104A-104E to positively acknowledge the reception of an audio packet. When source device 102 does not receive an acknowledgment (ACK) packet from a targeted sink device to which an audio packet was transmitted, source device 102 attempts to retry transmitting the audio packet a predetermined number of times. Retrying the transmission of audio packets leads to delays in sending audio packets to other sink devices, as source device 102 will not transmit an audio packet to the other sink device until it retries transmitting an audio packet to the original sink device a predetermined number of times. In accordance with one embodiment, one approach to reducing this latency is to disable the retrying of audio packets. However, this may create excessive gaps in the audio stream, thereby leading to audio drops. In accordance with another embodiment, a number of retry attempts is dynamically determined to balance latency and packet loss. For example, latency improvement logic 106 may determine the number of retry attempts based on a determined quality of the wireless channel of the wireless communications network used to transmit and receive audio packets. For example, as described above in Subsection II.A.c, channel analysis logic 108 of each of sink devices 104A-104E may determine characteristics of the wireless channel between its sink device and source device 102 and provide the determined characteristics to source device 102. Source device 102 may determine the quality of the channel for each of sink devices 104A-104E based on the determined characteristics. In another example, latency improvement logic 106 may determine the quality of the channel based on whether or not sink devices 104A-104E received packets from source device 102. For example, if the number of audio packets not received by a particular sink device is above a predetermined threshold, latency improvement logic 106 may determine that the quality of the channel for that sink device is poor. In either example, upon determining that the channel quality is poor, latency improvement logic 106 may increase the number of retry attempts performed by source device 102. Latency improvement logic 106 may determine that the number of retry attempts is to be decreased in the event that the channel quality improves.

e. Disabling of Acknowledgments

Wireless communication protocol standards (e.g., IEEE 802.11-based standards) may include a mechanism for sink devices 104A-104E to disable the transmission of acknowledgments. In accordance with an embodiment, in the event that channel analysis logic 108 and/or latency improvement logic 106 determine that the channel quality is good (e.g., the channel quality is above the predetermined threshold), the transmission of acknowledgments by sink devices 104A-104E may be disabled. For example, latency improvement logic 106 may transmit a message to sink devices 104A-104E that causes sink devices 104A104E to no longer transmit acknowledgement messages. Latency improvement logic 106 may also cause source device 102 to enter a no acknowledgement mode in which source device 102 is configured to no longer check for acknowledgement messages. This may advantageously reduce the use of the wireless channel and increase the transmission/reception latency of audio packets.

f. Packet Size/Fragmentation

Determining the optimum audio packet size for transmission by source device 102 may enable the efficient use of the wireless channel Packet size affects the end-to-end latency. In addition, if relatively larger packet sizes are transmitted, interference will cause the whole audio packet to be re-sent. However, if relatively smaller audio packets are transmitted, then the retransmission is limited to the time required to send that smaller audio packet. Wireless communication protocol standards (e.g., IEEE 802.11-based standards) may include a mechanism to determine a fragmentation threshold. The fragmentation threshold determines the maximum size of the audio packet to be transmitted. Audio packets having a size greater than the fragmentation threshold are divided into smaller packets. In accordance with an embodiment, the fragmentation threshold is varied (e.g., dynamically determined) based on the quality of the channel and/or the determined retry amount (as described above in Subsections II.A.c and II.A.d), where the fragmentation threshold is increased when the quality of the wireless channel is relatively good and the fragmentation threshold is decreased when the quality of the wireless channel is relatively poor. The ability to dynamically vary this threshold advantageously improves the efficiency of transmission.

g. Dynamic Channel Switching

Audio has stringent delivery time requirements. This is not a problem with wired sink devices (e.g., speakers). However, when using a shared wireless medium, delivery times are not guaranteed. Audio packets are captured at regular intervals from the source (e.g., a live audio/video feed or stream, a CD, a DVD, etc.) and provided to the MAC driver of source device 102 for delivery to sink devices 104A-104E. Because the audio packets are provided via a medium shared between sink devices 104A-104E, not all audio packets may reach each of sink devices 104A-104E on time, and in some cases, some audio packets may not ever reach the sink devices 104A-104E (e.g., in extremely bad channel conditions). This results in sink devices 104A-104E dropping packets. When the quality of the channel goes below a certain threshold, it becomes easily audible (i.e., gaps in audio are easily noticeable). To remedy this issue, latency improvement logic 106 may be configured to change to a different wireless channel based on the quality of the wireless channel currently being used.

In accordance with an embodiment, the quality of the wireless channel may be determined by latency improvement logic 106. For example, source device 102 may transmit audio packets to sink devices 104A-104E in a unicast (i.e., source device 102 transmits audio packets to a single, targeted sink device). When unicasting audio packets, the targeted sink device is configured to transmit an acknowledgement message to source device 102 in response to successfully receiving the audio packet. If source device 102 fails to receive an acknowledgement message from the targeted sink device (even after a pre-determined number of retries), latency improvement logic 106 may determine that the audio packet has been lost. If the number of audio packets lost over a predetermined time period is below a predetermined threshold, latency improvement logic 106 may determine that the quality of the wireless channel used to transmit the audio packet to the targeted sink device is poor and determine a new wireless channel to be used for sink devices 104A-104E.

The poor quality of the wireless channel may be transient in nature (i.e., temporary). Thus, latency improvement logic 106 may be configured to determine whether the number of lost audio packets is below a predetermined threshold over several periods of time (rather than a single period of time) and change the channel if the number of lost audio packets is above the predetermined threshold for more than one period of time.

In accordance with another embodiment, the quality of the wireless channel may be determined by channel analysis logic 108 of each of sink devices 104A-104E. For example, source device 102 may broadcast an audio packet to sink devices 104A-104E. When broadcasting audio packets, sink devices 104A-104E do not provide an acknowledgement message responsive to receiving the audio packet. However, as audio transmission is isochronous, each of sink devices 104A-104E knows when it is expected to receive the next audio packet. If the next audio packet does not arrive within a pre-determined amount of time from the last audio packet, channel analysis logic 108 determines that that audio packet is lost or delayed. Each of sink devices 104A-104E may accumulate the number of audio packets that have been lost or delayed over a predetermined period of time and transmit an indication to latency improvement logic 106 that is indicative of the number of audio packets that have been lost or delayed for that predetermined period of time. If any of the indications provided by each of sink devices 104A-104E indicate that the number audio packets lost or delayed is above a predetermined threshold, latency improvement logic 106 may determine that the wireless channel is poor and determine a new wireless channel to be used for sink devices 104A-104E.

Latency improvement logic 106 may determine the new wireless channel to be switched to in many ways. For example, in accordance with an embodiment, latency improvement logic 106 causes sink devices 104A-104E to be disconnected from the wireless network, switches to the next available channel in the wireless spectrum, and begins transmitting a beacon containing an identifier (e.g., a Service Set Identifier (SSID)) of source device 102 via that channel. Sink devices 104A-104E, after determining that they have disconnected, initiate a scan mechanism. Once each of sink devices 104A-104E receives the beacon from source device 102, each of sink devices 104A-104E performs an authentication process and/or an association process and joins the wireless network. Each of sink devices 104A-104E then receives and plays back audio packets received from source device 102 via the newly-selected wireless channel In accordance with an embodiment, before causing sink devices 104A-104E to be disconnected, source device 102 may unicast a packet to each of sink device 104A-104E that indicates to the targeted sink device that source device 102 is going to switch to a different channel and identifies the channel number for that different channel. In accordance with such an embodiment, each of sink devices 104A-104E scans the identified the wireless channel until it detects the beacon.

In accordance with another embodiment, latency improvement logic 106 analyzes all the wireless channels of the wireless network to find the best available channel (i.e., the channel having the best quality). Once latency improvement logic 106 determines the best channel, it switches to that channel and begins broadcasting the beacon. Each of sink devices 104A-104E, having been disconnected from the wireless network, listens for the beacon during the scanning process. After detecting the beacon, each of sink devices 104A-104E performs an authentication process and/or an association process and joins the wireless network.

In order to find the channel having the best quality, latency improvement logic 106 may analyze several criteria associated with each channel Such criteria include, but are not limited to, the packet error rate when transmitting audio packets via the channel, the number of access points discovered on that channel, the number of retry attempts on that channel, the signal strength of that channel, the signal-to-noise ratio of that channel and/or the number of data packets being transmitted on that channel. A weighted average of the above criteria may be obtained for each channel and the channel having the lowest average may be selected as the new channel.

In accordance with yet another embodiment, the task of analyzing all of the wireless channels is distributed between source device 102 and each of sink devices 104A-104E. For example, latency improvement logic 106 may unicast a packet to each of sink devices 104A-104E that indicates a subset of channels that sink device (e.g., channel analysis logic 108 of that sink device) should analyze. Latency improvement logic 106 may analyze the channels not identified in any of the unicast packets. For example, channel analysis logic 108 of sink device 104A may receive a packet that indicates that it is to analyze channels 0 and 1, channel analysis logic 108 of sink device 104B may receive a packet that indicates that it is to analyze channels 2 and 3, channel analysis logic 108 of sink device 104C may receive a packet that indicates that it is to analyze channels 4 and 5, channel analysis logic 108 of sink device 104D may receive a packet that indicates that it is to analyze channels 6 and 7, channel analysis logic 108 of sink device 104E may receive a packet that indicates that it is to analyze channels 8 and 9, and latency improvement logic 106 may analyze channels 10 and 11. It is noted that the channel numbers used in the example described above is purely exemplary and that each of sink devices 104A-104E and source device 102 may analyze any channel in any order (e.g., a random order).

After channel analysis logic 108 of each of sink devices 104A-104E analyzes its assigned channels, each of sink devices 104A-104E may obtain a weighted average of the above criteria for each analyzed channel to determine the channel having the lowest average. Each of sink devices 104A-104E may transmit a message to source device 102 that identifies the determined channel and its weighted average. Latency improvement logic 106 compares each of the weighted averages provided by each of sink devices 104A-104E and the lowest weighted average determined for the channels it itself has analyzed and switches to using the channel having the lowest weighted average. Source device 102 may then unicast a packet to each of sink devices 104A-104E that indicates to the targeted sink device that source device 102 is going to switch to a different channel and identifies the channel number for that different channel. In accordance with such an embodiment, each of sink devices 104A-104E scans the identified wireless channel until it detects the beacon.

The above-described embodiment advantageously reduces the time to analyze each of the wireless channels. This embodiment may also advantageously detect certain scenarios where the noise levels around source device 102 are adequate for a particular channel but are bad at a particular sink device's location because of proximity to noise generators thereto.

In accordance with a further embodiment, each of sink devices 104A-104E and source device 102 may analyze all the wireless channels at the same time. In accordance with such an embodiment, each of sink devices 104A-104E transmits a message to source device 102 that identifies the channel having the lowest weighted average. While this embodiment may result in a longer scan time, source device 102 will have the benefit of determining the quality of the channel at the point of each of sink devices 104A-104E.

The assumption in the above-described embodiments is that there is only one antenna that is used for both transmitting audio and analyzing the channel. However, in accordance with an embodiment, each of sink devices 104A-104E and source device 102 may include one or more additional antenna(s), thereby enabling source device 102 and sink devices 104A-104E to transmit/receive audio packets via one antenna and simultaneously analyze the channels via another antenna. The weighted averages calculated by each of sink devices 104A-104E may be periodically provided to source device 102, and source device 102 may determine the channel having the best quality on a periodic basis. In this way, latency improvement logic 106 may be enabled to switch to the determined channel almost instantly upon detecting that the quality of the wireless channel currently being used is poor. In other words, an analysis of all of the wireless channels does not need to occur after detecting that the quality of the wireless channel currently being used is poor.

h. Quality of Service (QoS)

Source device 102 may implement a Quality of Service mechanism in which source device 102 maintains one or more queues that are used to store packets having varying priority. For example, a first queue may store packets having a first priority, a second queue may store packets having a second priority that is lower than the first priority, and so on and so forth. Packets stored in the first queue are transmitted by source device 102 before packets stored in the other queues. In accordance with an embodiment, due to the real-time requirement of audio (and/or video), audio packets (and/or video packets) may be stored in the first queue, thereby ensuring that the audio packets (and/or video packets) are given priority over any other packet. This advantageously improves the chances of the audio packets (and/or video packets) being transmitted across the channel in a timely manner, as the arbitration inter-frame spacing (AIFS) times (i.e., the period that source device 102 must wait before transmitting the next audio and/or video packet) are lower, thereby reducing the latency in transmitting such packets. In accordance with an embodiment, the AIFS time associated with the first queue is set to 0.

i. Frame Aggregation

Wireless communication protocol standards (e.g., IEEE 802.11-based standards) may support a frame aggregation mode that enables a source device 102 to aggregate audio packets such that they are transmitted in one burst without the overhead of separate headers, etc. This, however, adds latency, as source device 102 must wait for multiple audio packets from the same source before transmitting the audio packets.

Thus, in accordance with an embodiment, frame aggregation is disabled to reduce the latency attributed to aggregating the audio packets. For example, latency improvement logic 106 may disable the frame aggregation mode by default upon source device 102 being power on.

j. Channel Reservation

One major reason for latency arises from source device 102 not obtaining access to the wireless medium when it needs to send out an audio packet at a predefined time to sink devices 104A-104E. One way to mitigate this is to have source device 102 transmit a message (e.g., a Clear to Send (CTS) frame) to itself before it actually needs the channel. Other devices connected to the wireless network, after detecting the message, will not transmit any packets for a predetermined period of time. Thus, the channel is reserved for source device 102 for this predetermined period of time, and audio packet(s) transmitted at this time can be delivered without conflict.

In accordance with an embodiment, the predetermined period of time for channel reservation may be set in a Network Allocation Vector (NAV) field of the CTS frame. For example, before sending an audio packet (e.g., 2 ms before), latency improvement logic 106 may format the CTS frame to have its NAV field set to 4 ms. The formatted CTS frame may then be transmitted by source device 102. If the CTS frame is transmitted within 2 ms, then the channel will be free for another 2 ms, during which the audio packet can be sent without conflict from any other transmitting device.

k. Dynamic Rate Control

When audio packets are transmitted by source device 102 at high speeds, they are more prone to interference errors. In accordance with an embodiment, when the number of retry attempts for a particular channel exceeds a certain threshold for a duration of time (thereby indicating that there may be channel interference), latency improvement logic 106 may cause source device 102 to attempt the transmission of an audio packet at a lower speed (e.g., at a lower transmission rate). When the number of retry attempts is lower than the certain threshold, then latency improvement logic 106 may cause source device 102 to resume transmitting audio packets at a higher speed. This advantageously reduces the number of retry attempts, and therefore, the latency when transmitting audio packets.

l. Unicasting and Broadcasting Audio Packets

As described above, in accordance with an embodiment, source device 102 may be configured to unicast audio packets individually to each of sink devices 104A-104E. The audio packets may be unicasted to each of sink devices 104A-104E in a round robin fashion. One advantage of unicasting audio packets is that this audio packets can be transmitted at the fastest rate possible to a particular sink device. The size of the data packet may be anywhere between 256 bytes (128 samples, 16 bits/sample at a 48 Khz sampling rate) to 2048 bytes, although embodiments described herein are not so limited.

It has been observed that small sample sizes result in lower latency when unicasting packets. For example, if 128 samples (with 16 bits per sample) for a 48 khz stereo audio stream are to be transmitted, then each sample will be available every 2.6 ms. Thus, 256 bytes (128×2) need to be transferred to a sink device every 2.6 ms. If there are six sink devices, each receiving different audio packets (e.g., for multi-channel audio), then 1536 bytes (256×6) of data must be transferred every 2.6 ms. At a 54 mbps rate, an audio packet of 1500 bytes would take over 300 μs to be transferred per sink device. This time includes the associated headers, Short Interframe Space (SIFS)/Distributed Coordination Function (DCF) Interframe Space (DIFS) durations and the acknowledgement message. This transfer time increases to nearly 2 ms in perfect channel conditions for six sink devices.

If packets are lost, a retry is initiated by source device 102 and the contention window doubles. This causes further delay in sending out the audio packet. In such situations, it is not uncommon to see audio packets taking over 1 ms to be transferred when there are retry attempts. This can affect the 2.6 ms requirement to send the next audio packet in time.

This may be mitigated by broadcasting audio packets instead of unicasting packets. Accordingly, in accordance with another embodiment, source device 102 is configured to broadcast audio packets to sink devices 104A-104E. When broadcasting, audio packets are transmitted at the lowest unicast rate across sink devices 104A-104E. In addition, error recovery is not possible, as sink devices 104A-104E do not provide an acknowledgement message to source device 102. Nonetheless, there are some advantages to broadcasting audio packets.

In accordance with an embodiment, source device 102 is configured to send only one packet per sample interval. The one packet will contain the data for all sink devices 104A-104E for that sample period. In the event that additional sink devices are added and/or the sample size is increased, latency improvement logic 106 may compress the audio data before transmitting the audio data as audio packets. Sink devices 104A-104E may receive the common audio packet, decompress the data included therein and utilize the bytes that are relative to them. By doing so, only one packet needs to be transmitted every 2.6 ms. This of course also implies that packet losses could be higher as there is no acknowledgment/retry mechanism.

In accordance with an embodiment, one way to reduce packet loss is for source device 102 to transmit the same packet twice every 2.6 ms. Smaller packet sizes are less prone to collisions. Even if there is a collision, since the lost packet carries fewer bytes, error recovery techniques utilized by sink devices 104A-104E can help conceal audio drops. Source device 102 may further implement a lossless compression scheme to further reduce the amount of the data to be transferred.

m. Methods for Reducing Latency

Figure 2:
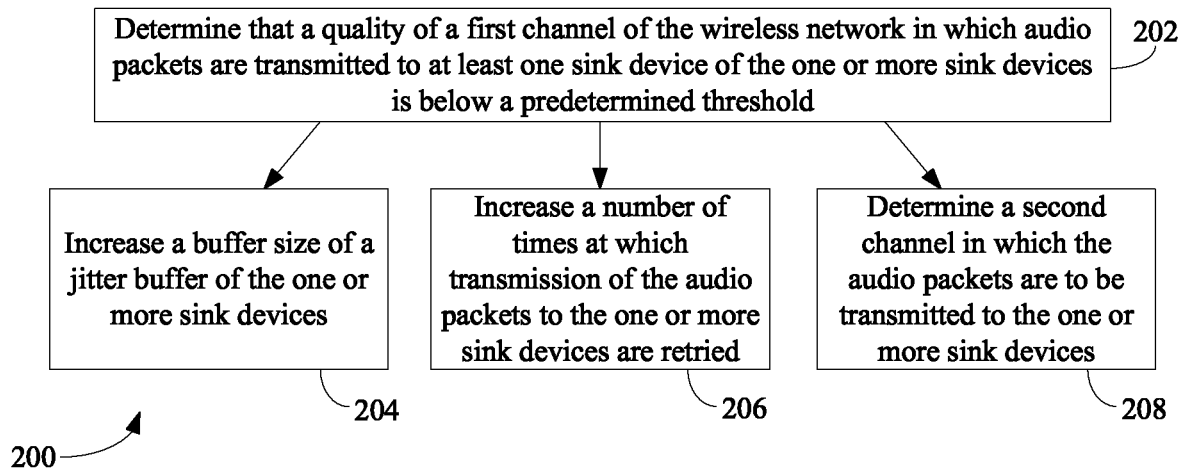
FIG. 2 depicts a flowchart of a method implemented by a source device that reduces the latency in transmission of audio packets between a source device and one or more sink devices in accordance with an embodiment.
Figure 3:
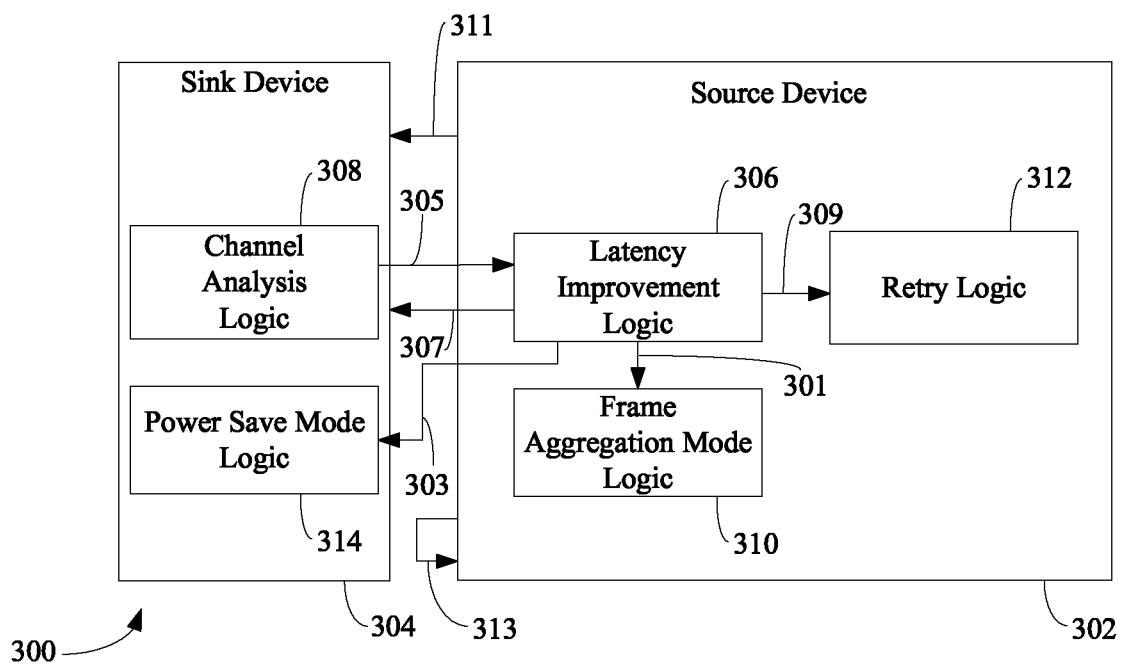
FIG. 3 is a block diagram of a source device coupled to a sink device in accordance with an embodiment.

Accordingly, in embodiments, a source device may reduce the latency when transmitting audio packets to one or more sink devices. For instance, FIG. 2 depicts a flowchart 200 of a method implemented by a source device that reduces the latency in transmission of audio packets between source device and one or more sink devices in accordance with an embodiment. The method of flowchart 200 may be implemented by a source device 302 shown in FIG. 3. FIG. 3 is a block diagram 300 of source device 302 coupled to a sink device 304 in accordance with an embodiment. Source device 302 is an example of source device 102, and sink device 304 is an example of any of sink devices 104A-104E, as described above in reference to FIG. 1. As shown in FIG. 3, source device 302 includes latency improvement logic 306, frame aggregation mode logic 310 and retry logic 312, and sink device 304 includes channel analysis logic 308 and power saving mode logic 314. Latency improvement logic 306 is an example of latency improvement logic 106, and channel analysis logic 308 is an example of channel analysis logic 108, as respectively shown in FIG. 1. Other structural and operational embodiments will be apparent to persons skilled in the relevant art(s) based on the following discussion regarding flowchart 200 and source device 302.

Flowchart 200 begins with step 202. At step 202, it is determined that a quality of a first channel of the wireless network in which audio packets are transmitted to at least one sink device of the sink device(s) is below a predetermined threshold. In response to determining that the quality of the first channel is below the predetermined threshold, at least one of step 204, 206 and/or 208 are performed. For example, with reference to FIG. 3, channel analysis logic 308 of sink device 304 may analyze the channel, determine characteristics indicative of the quality of the channel, and provide characteristics (e.g., via a message 305) to latency improvement logic 306. Latency improvement logic 306 may determine whether the characteristics are below a predetermined threshold. If latency improvement logic 306 determines that the characteristics are below the predetermined threshold, latency improvement logic 306 performs at least one of steps 204, 206 and/or 208.

At step 204, a buffer size of a jitter buffer of the sink devices is increased. For example, with reference to FIG. 3, latency improvement logic 306 transmits a message 307 to sink device 304 that identifies the size that a jitter buffer (not shown) implemented thereby should be increased to. Sink device 304 increases the jitter buffer accordingly.

At step 206, a number of times at which transmission of the audio packets to the sink device(s) are retried is increased. For example, with reference to FIG. 3, latency improvement logic 306 transmits a signal 309 to retry logic 312 that causes the number of times audio packets transmitted by source device 302 are retried in the event of a lost audio packet.

At step 208, a second channel in which the audio packets are to be transmitted to the sink device(s) is determined. For example, with reference to FIG. 3, latency improvement logic 306 may determine the second channel.

In accordance with one or more embodiments, the audio packets are transmitted to each sink device of the sink device(s) individually (i.e., the audio packets are unicasted to the sink device(s)). For example, with reference to FIG. 3, source device 302 transmits audio packets 311 to sink device 304 (and other sink devices (not shown) coupled to source device 302) individually.

In accordance with one or more embodiments, the audio packets are broadcast to each sink device of the sink device(s). For example, with reference to FIG. 3, source device 302 broadcasts audio packets 311 to sink device 304 (and other sink devices (not shown) coupled to source device 302.

In accordance with one or more embodiments, one or more layers of a network stack implemented by the source device are bypassed when transmitting audio packets to the sink device(s). For example, with reference to FIG. 3, audio packets 311 bypass layer(s) of a network stack (not shown) implemented by source device 302 when being transmitted to sink device 304.

In accordance with one or more embodiments, a message is transmitted by the source device that causes the first channel to be reserved by the source device, and audio packets are transmitted to the sink device(s) in the reserved first channel. For example, with reference to FIG. 3, source device 302 may transmit a message 313 to itself, which causes the first channel to be reserved by source device 302. Source device transmits audio packets 311 to sink device 304 in the reserved channel.

In accordance with one or more embodiments, the sink device(s) are loudspeakers. For example, with reference to FIG. 3, sink device 304 is a loudspeaker.

In accordance with one or more embodiments, one or more operating modes of at least one of the source device and the one or more sink devices are disabled. For example, with reference to FIG. 3, latency improvement logic 306 disables operating mode(s) of at least one of the source device and the sink device(s) (e.g., sink device 304).

In accordance with one or more embodiments, disabling operating mode(s) of at least one of the source device and the sink device(s) comprises disabling a frame aggregation mode of the source device, the frame aggregation mode causing the audio packets to be aggregated into a predetermined packet size before being transmitted to the sink device(s). For example, with reference to FIG. 3, latency improvement logic 306 may transmit a signal 301 to frame aggregation mode logic 308, which causes the frame aggregation mode to be disabled.

In accordance with one or more embodiments, disabling operating mode(s) of at least one of the source device and the sink device(s) comprises disabling a power saving mode of sink device(s), the power saving mode causing the sink device(s) to be placed in a low power state after a predetermined time period. For example, with reference to FIG. 3, latency improvement logic 306 may transmit a signal 303 to power saving mode logic 314 of sink device 304, which causes the power save mode of sink device 304 to be disabled.

Figure 4:
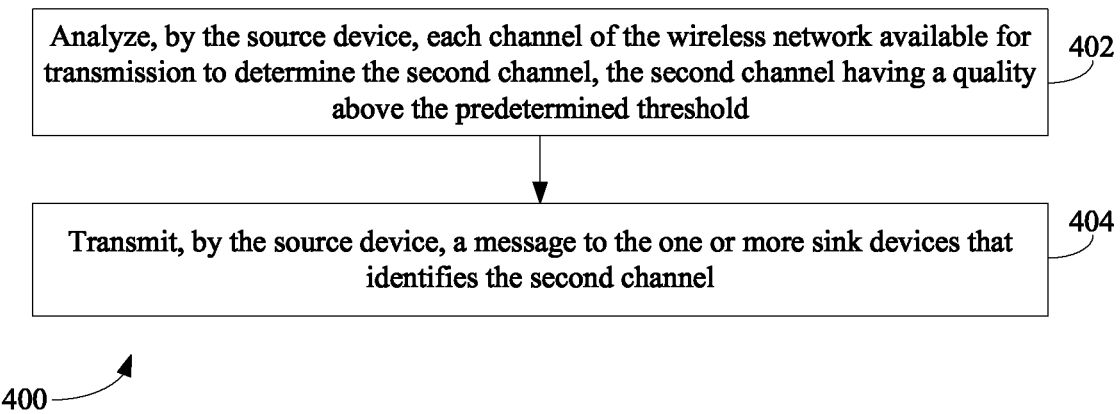
FIG. 4 depicts a flowchart of a method implemented by a source device for determining a second channel by analyzing all the channels of a wireless network in accordance with an embodiment.
Figure 5:
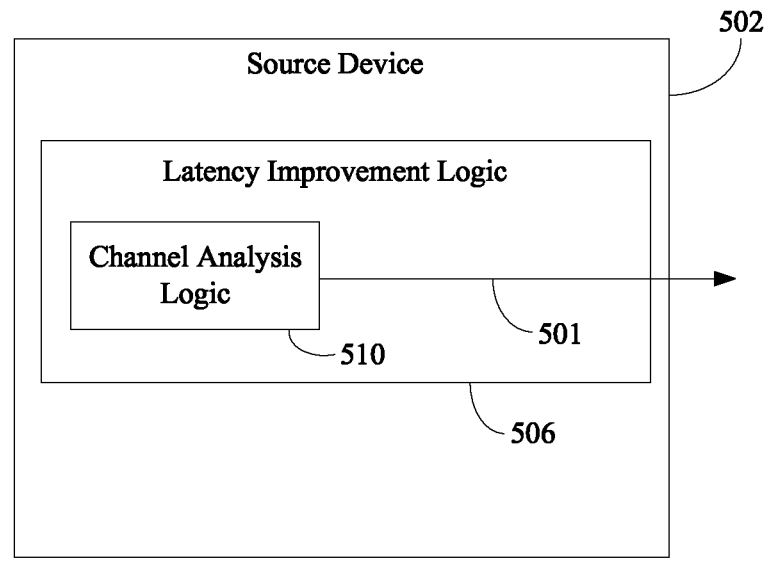
FIG. 5 is a block diagram of a source device in accordance with an embodiment.

In accordance with one or more embodiments, the second channel is determined by analyzing, by the source device, certain criteria associated with each channel of the wireless network available for transmission. Accordingly, FIG. 4 depicts a flowchart 400 of a method implemented by a source device for determining a second channel by analyzing all the channels of the wireless network in accordance with an embodiment. The method of flowchart 400 may be implemented by a source device 502 shown in FIG. 5. FIG. 5 is a block diagram 500 of source device 502 in accordance with an embodiment. Source device 502 is an example of source device 302, as shown in FIG. 3. As shown in FIG. 5, source device 502 includes latency improvement logic 506. Latency improvement logic 506 is an example of latency improvement logic 306, as shown in FIG. 3. Latency reduction logic 506 includes channel analysis logic 510. Other structural and operational embodiments will be apparent to persons skilled in the relevant art(s) based on the following discussion regarding flowchart 400 and source device 502.

Flowchart 400 begins with step 402. At step 402, each available channel of the wireless network is analyzed by the source device to determine the second channel, the second channel having a quality above the predetermined threshold. For example, with reference to FIG. 5, channel analysis logic 510 analyzes each channel of the wireless network and determines the channel having a quality above the predetermined threshold. For example, channel analysis logic 510 may determine the channel that has the highest quality from among the available channels.

At step 404, a message is transmitted to the sink device(s) that identifies the second channel. For example, with reference to FIG. 5, channel analysis logic 510 transmits a message 501 to sink device(s) (not shown) that identifies the second channel.

Figure 6:
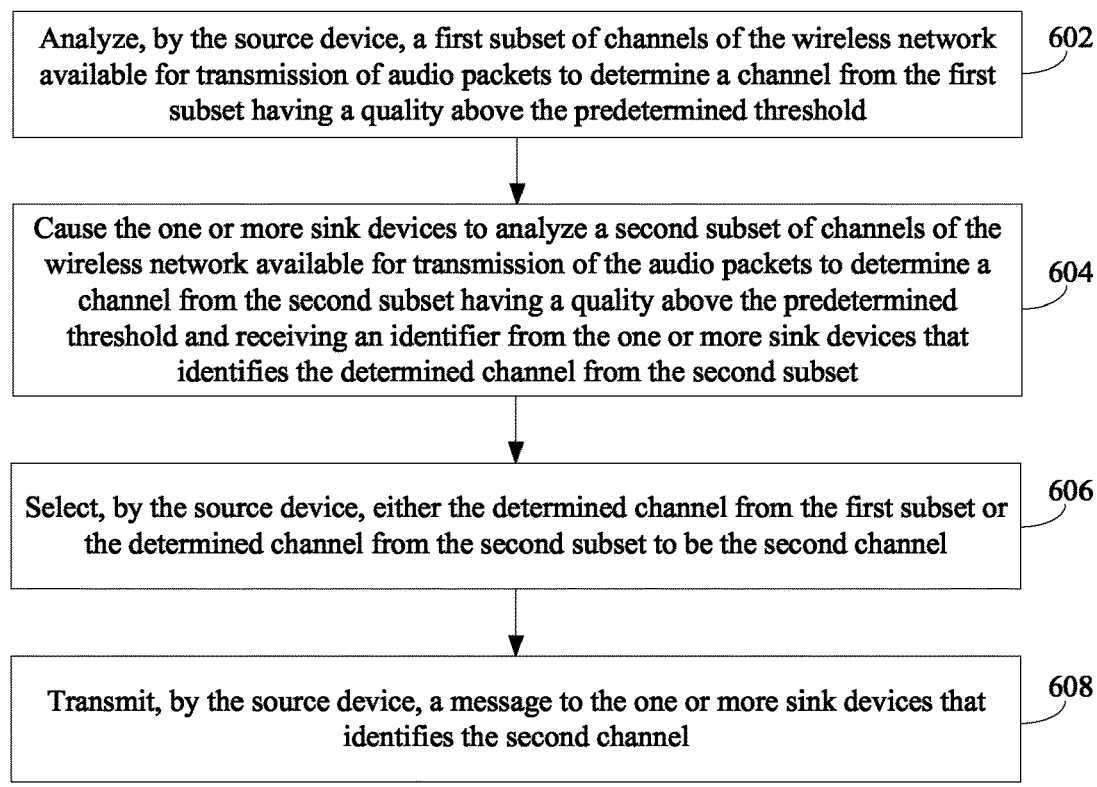
FIG. 6 depicts a flowchart of a method implemented by a source device for determining a second channel in which audio packets are to be transmitted to sink device(s) using a distributed analysis of the channels of a wireless network in accordance with an embodiment.
Figure 7:
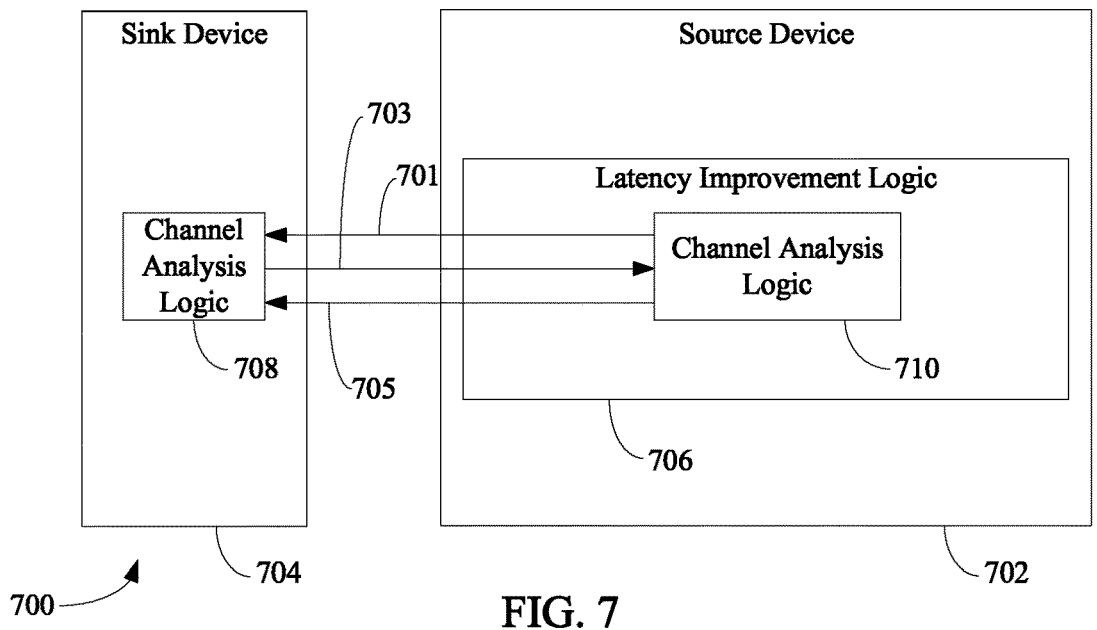
FIG. 7 is a block diagram of a source device coupled to a sink device in accordance with an embodiment

In accordance with one or more embodiments, the analysis of available channels is distributed between the sink device(s) and the source. Accordingly, FIG. 6 depicts a flowchart 600 of a method implemented by a source device for determining a second channel in which audio packets are to be transmitted to sink device(s) using a distributed analysis of the channels of the wireless network in accordance with an embodiment. The method of flowchart 600 may be implemented by a source device 702 shown in FIG. 7. FIG. 7 is a block diagram 700 of source device 702 coupled to a sink device 704 in accordance with an embodiment. Source device 702 is an example of source device 502, as shown in FIG. 5, and sink device 704 is an example of sink device 304, as shown in FIG. 3. As shown in FIG. 7, source device 702 includes latency improvement logic 706, and, sink device 704 includes channel analysis logic 708. Latency improvement logic 706 and channel analysis logic 710 are examples of latency improvement logic 506 and channel analysis logic 510, as shown in FIG. 5. Channel analysis logic 708 is an example of channel analysis logic 308 as shown in FIG. 3. Other structural and operational embodiments will be apparent to persons skilled in the relevant art(s) based on the following discussion regarding flowchart 600 and source device 702.

Flowchart 600 begins with step 602. At step 602, a first subset of channels of the wireless network available for transmission of audio packets are analyzed by the source device to determine a channel from the first subset having a quality above the predetermined threshold. For example, with reference to FIG. 7, channel analysis logic 710 analyzes the first subset of channels of the wireless network to determine a channel having a quality above the predetermined threshold.

At step 604, sink device(s) are caused to scan a second subset of channels of the wireless network available for transmission of the audio packets to determine a channel from the second subset having a quality above the predetermined threshold, and an identifier from the sink device(s) is received that identifies the determined channel from the second subset. For example, with reference to FIG. 3, source device 702 transmits a message 701 to sink device 704 that identifies the second subset of channels that are to be analyzed by sink device 704. Upon receiving the message, sink device 704 analyzes the second subset of wireless channels and transmits an indication 703 that identifies the determined channel from the second subset.

At step 606, the source device selects either the determined channel from the first subset or the determined channel from the second subset to be the second channel. For example, with reference to FIG. 3, channel analysis logic 710 selects either the determined channel from the first subset or the determined channel from the second subset to be the second channel. For instance, channel analysis logic 710 may select the determined channel that has the highest quality.

At step 608, the source device transmits a message to the sink device(s) that indicates the selected channel. For example, with reference to FIG. 7, source device 702 transmits a message 705 that identifies the selected channel.

B. Speaker/Clock Synchronization

The time and/or rate at which audio packets are transmitted by the source device is based on a system clock signal (e.g., a transmitter clock signal). Each of the sink devices also utilize a system clock signal (e.g., a receiver clock signal). The time and/or rate at which audio packets are played back by the sink device(s) is based on the receiver clock signal. Ideally the transmitter clock signal and the receiver clock signal should be synchronized to ensure that audio is played back at the same time and rate on each of the sink device(s).

Figure 8:
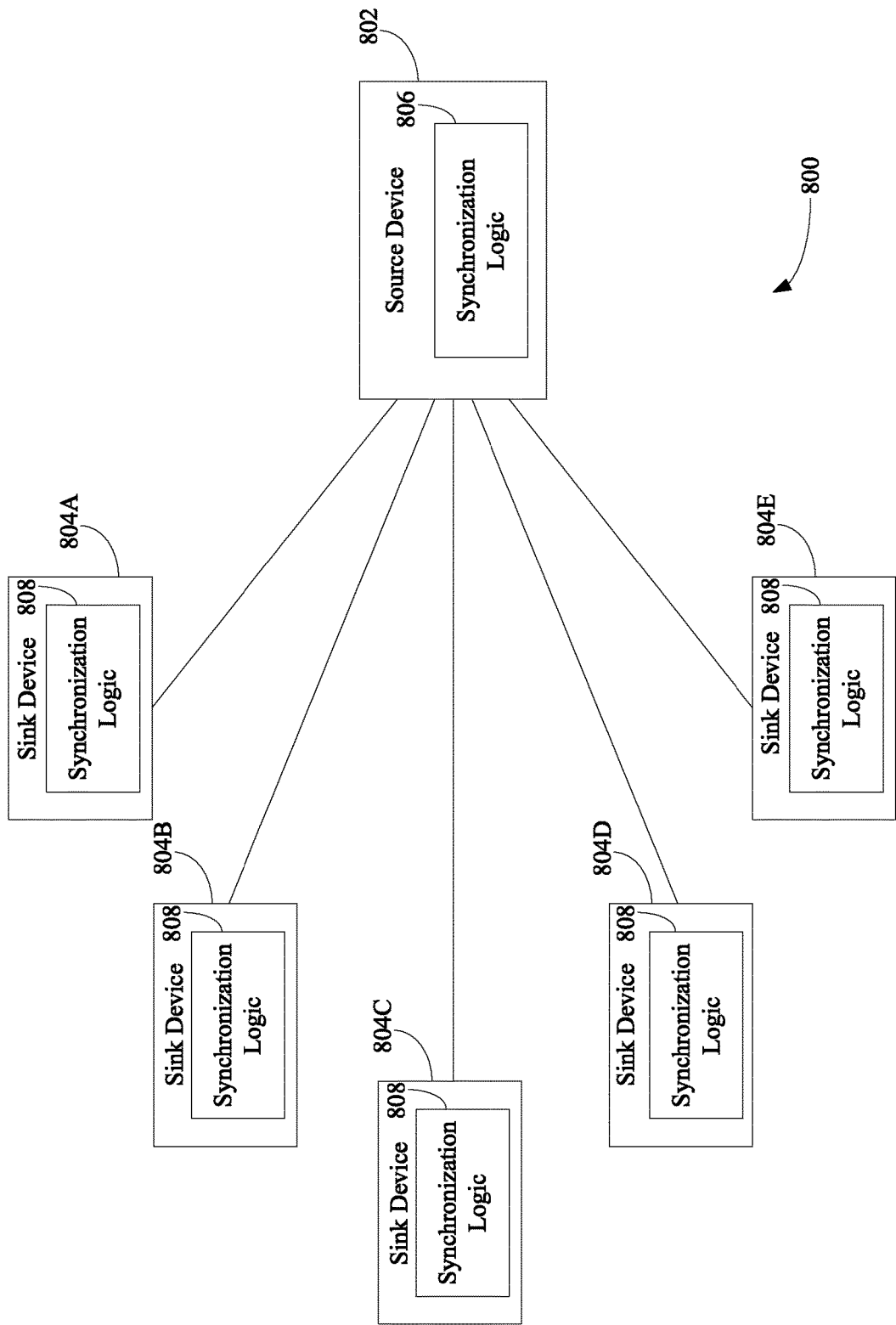
FIG. 8 is a block diagram of a system that is configured to synchronize playback of audio packets between a plurality of sink devices via a wireless communication protocol in accordance with an embodiment.

FIG. 8 is a block diagram of a system 800 that is configured to synchronize playback of audio packets between a plurality of sink devices 804A-804E via a wireless communication protocol in accordance with an embodiment. As shown in FIG. 8, system 800 includes a source device 802 and sink devices 804A-804E. Source device 802 and sink devices 804A-804E are examples of source device 102 and sink device 104A-104E, as respectively described above with reference to FIG. 1.

As shown in FIG. 8, source device 802 includes synchronization logic 806, and each of sink devices 804A-804E comprise synchronization logic 808. In a typical wireless network, such as a Wi-Fi network, source device 802 and each of sink devices 804A-804E are tuned to a known carrier frequency for source device 802 to reliably transmit wireless data to sink devices 804A-804E. For example, when source device 802 and sink devices 804A-804E use a particular radio frequency band (such as 2.4 GHz or 5 GHz), source device 802 and sink devices 804A-804E tune their oscillators precisely to a common frequency which allows them to send and receive signals. Hence, subsumed within such a wireless system is a tuned system. One way that sink devices 804A-804E tune their oscillators to the same frequency as source device 802 is by source device 802 sending a beacon signal at a fixed, pre-determined time interval (e.g., every 100 ms). The beacon signal may include a timestamp indicative of the time at which the beacon signal was transmitted by source device 802.

In accordance with an embodiment, the beacon signal may be used to determine a relationship between the transmitter clock signal of source device 102 and the receiver clock signal for each of sink devices 804A-804E and adjust the playback of audio packets at sink devices 804A-804E accordingly. For example, source device 802 may determine a first timing parameter that is indicative of a relationship of the transmitter clock signal of source device 802 and the timestamp to be included the beacon. Source device 802 includes the first timing parameter in the beacon signal and transmits the beacon signal (that also includes the timestamp) to sink devices 804A-804E. Synchronization logic 808 of each of sink devices 804A-804E receives the beacon signal and determines the timestamp and first timing parameter included therein. Synchronization logic 808 of each of sink devices 804A-804E determines a second timing parameter that is indicative of a relationship of its associated receiver clock signal and the timestamp included the beacon signal. Synchronization logic 808 of each of sink devices 804A-804E then determines a clock scaling factor based on the first timing parameter and the second timing parameter.

In accordance with an embodiment, synchronization logic 806 of source device 802 determines the first timing parameter and synchronization logic 808 of each of sink device 804A-804E determines the second timing parameter in accordance with Equations 1 and 2, which are provided below:

$$\text{First Timing Parameter} = Cbea/CsysTx \quad \text{(Equation 1)}$$

$$\text{Second Timing Parameter} = CsysRx/Cbea \quad \text{(Equation 2)}$$

where Cbea is the value of the timestamp included in the beacon signal, CsysTx is the transmitter clock signal of source device 804, and CsysRx is the receiver clock signal of a particular sink device (e.g., one of sink devices 804A-804E).

In accordance with such an embodiment, the clock scaling factor (CSF) is determined in accordance with Equation 3, which is shown below:

$$CSF = \text{Second Timing Parameter} * \text{First Timing Parameter} \quad \text{(Equation 3)}$$

In accordance with another embodiment, synchronization logic 806 of source device 802 determines the first timing parameter and synchronization logic 808 of each of sink device 804A-804E determines the second timing parameter in accordance with Equations 4 and 5, which are provided below:

First Timing Parameter=$C_{sys}Tx-CBea$ (Equation 4)

Second Timing Parameter=$C_{sys}Rx-CBea$ (Equation 5)

In accordance with such an embodiment, the CSF is determined in accordance with Equation 6, which is shown below:

CSF=Second Timing Parameter−First Timing Parameter (Equation 6)

It is noted that the Equations described above used to determine the clock scaling factor are purely exemplarily and that the clock scaling factor may be determined in other ways.

Once the clock scaling factor is determined, synchronization logic 808 of each of sink devices 804A-804E may adjust the playback of audio packets accordingly. For example, in accordance with an embodiment, synchronization logic 808 of each of sink devices 804A-804E may adjust its receiver clock signal such that clock scaling factor becomes as close to the value of 1 as possible. This may be achieved by using a phase-locked loop (PLL) implemented in each of sink devices 804A-804E. In accordance with another embodiment, fractional sampling techniques may be used, where audio packets are re-sampled to match the clock rate of the receiver clock signal based on the clock scaling factor.

Figure 9:
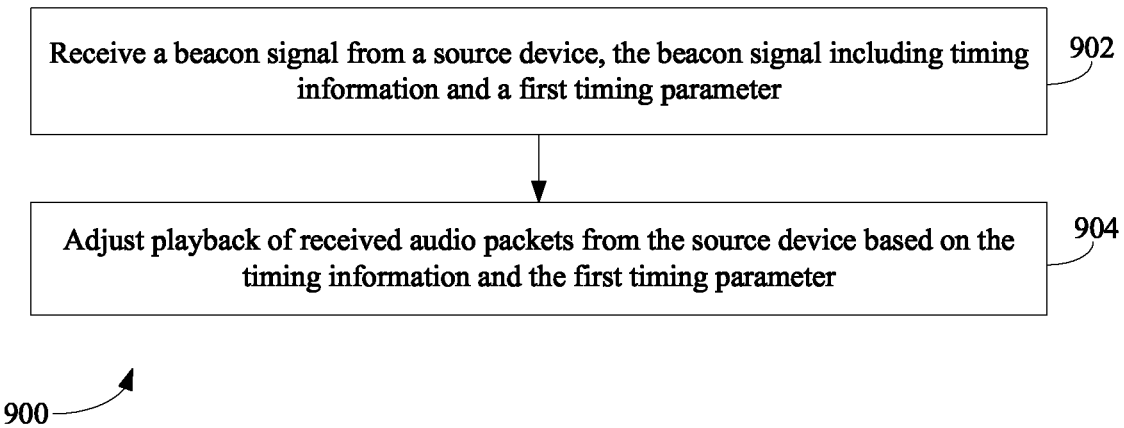
FIG. 9 depicts a flowchart of a method implemented by sink devices to synchronize playback of audio packets in accordance with an embodiment.
Figure 10:
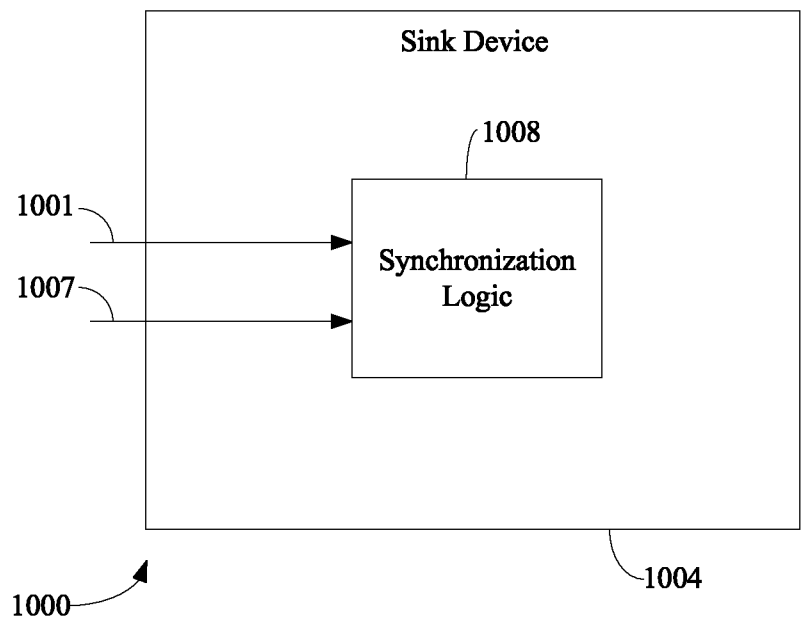
FIG. 10 is a block diagram of a sink device in accordance with an embodiment.

Accordingly, in embodiments, a plurality of sink devices may be configured to synchronize playback of audio packets in many ways. For instance, FIG. 9 depicts a flowchart 900 of a method implemented by sink devices to synchronize playback of audio packets in accordance with an embodiment. The method of flowchart 900 may be implemented by a sink device 1002 shown in FIG. 10. FIG. 10 is a block diagram 1000 of sink device 1004 in accordance with an embodiment. Sink device 1004 is an example of any of sink devices 804A-804E, as shown in FIG. 8. As shown in FIG. 10, sink device 1004 includes synchronization logic 1008. Synchronization logic 1008 is an example of synchronization logic 808, as shown in FIG. 8. Other structural and operational embodiments will be apparent to persons skilled in the relevant art(s) based on the following discussion regarding flowchart 900 and sink device 1004.

Flowchart 900 begins with step 902. At step 902, a beacon signal is received from a source device, the beacon signal including timing information and a first timing parameter. For example, as shown in FIG. 10, synchronization logic 1008 receives a beacon signal 1001 from a source device (e.g., source device 802, as shown in FIG. 8).

In accordance with one or more embodiments, the timing information is a timestamp at which the beacon signal was transmitted by the source device.

At step 904, playback of received audio packets from the source device are adjusted based on the timing information and the timing parameter. For example, with reference to FIG. 10, synchronization logic 1008 adjusts playback of audio packets 1007.

In accordance with one or more embodiments, the first timing parameter is based on the timing information and a transmitter clock signal implemented by the source device and that is indicative of when the audio packets is to be played back by the plurality of sink devices.

In accordance with one or more embodiments, the beacon signal is transmitted by the source device at a predetermined time interval (e.g., every 100 ms).

In accordance with one or more embodiments, the adjustment of the playback of the received audio packets comprises re-sampling the received audio packets to match a clock rate of the receiver clock signal based on the clock scaling factor to adjust playback of the received audio packets.

Figure 11:
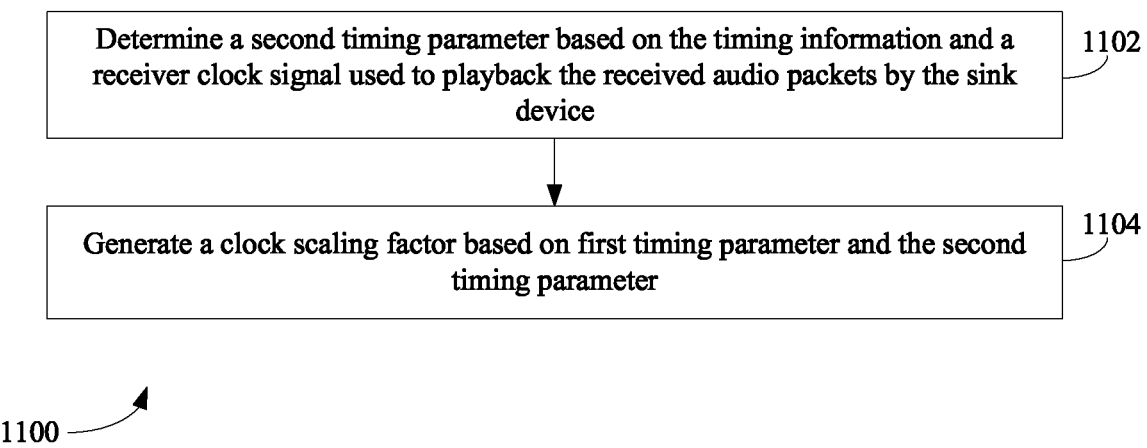
FIG. 11 depicts a flowchart of a method implemented by sink devices to generate a clock scaling factor in accordance with an embodiment.
Figure 12:
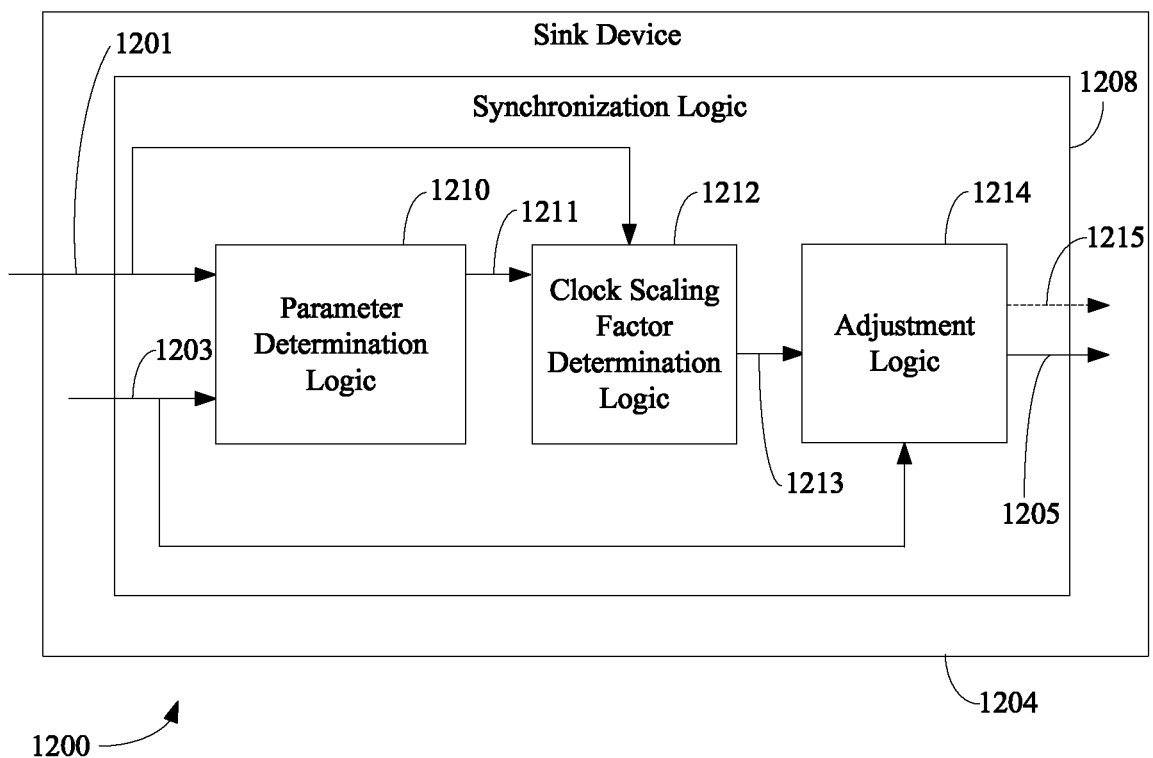
FIG. 12 is a block diagram of a sink device in accordance with an embodiment.

In accordance with one or more embodiments, the adjustment of the playback of the received audio packets may be based on a clock scaling factor. The clock scaling factor may be generated in accordance with the operations described in FIG. 11. FIG. 11 depicts a flowchart 1100 of a method implemented by sink devices to generate a clock scaling factor in accordance with an embodiment. The method of flowchart 1100 may be implemented by a sink device 1204 shown in FIG. 12. FIG. 12 is a block diagram 1200 of sink device 1204 in accordance with an embodiment. Sink device 1204 is an example of sink device 1004, as shown in FIG. 10. As shown in FIG. 12, sink device 1004 includes synchronization logic 1208. Synchronization logic 1208 is an example of synchronization logic 1008, as shown in FIG. 10. Synchronization logic 1208 includes parameter determination logic 1210, clock scaling factor determination logic 1212 and adjustment logic 1214. Other structural and operational embodiments will be apparent to persons skilled in the relevant art(s) based on the following discussion regarding flowchart 1100 and sink device 1204.

Flowchart 1100 begins with step 1102. At step 1102, a second timing parameter is determined based on the timing information and a receiver clock signal used to play back the received audio packets by the sink device. For example, with reference to FIG. 12, parameter determination logic 1210 determines a second timing parameter 1211 based on the timing information included in beacon signal 1201 and a receiver clock signal 1203. Beacon signal 1201 is an example of beacon signal 1001, as shown in FIG. 10.

At step 1104, a clock scaling factor is generated based on the first timing parameter and the second timing parameter. For example, with reference to FIG. 12, clock scaling factor determination logic 1212 determines a clock scaling factor 1213 based on the first timing parameter including in beacon signal 1201 and second timing parameter 1211.

In accordance with one or more embodiments, the adjustment of playback of the received audio packets is based on the clock scaling factor. For example, in accordance with one embodiment, the receiver clock signal is adjusted based on the clock scaling factor to adjust playback of the received audio packets. For instance, with reference to FIG. 12, adjustment logic 1214 adjusts receiver clock signal 1203 based on clock scaling factor 1213 to generate an adjusted receiver clock signal 1205. Adjustment logic 1214 may comprise a PLL that adjusts receiver clock signal 1203 based on clock scaling factor 1213. Playback of the received audio packets (e.g., audio packets 1007, as shown in FIG. 10) may be based on adjusted receiver clock signal 1205.

In accordance with another embodiment, the received audio packets are re-sampled to match a clock rate of the receiver clock signal based on the clock scaling factor to adjust playback of the received audio packets. For example, with reference to FIG. 12, adjustment logic 1214 re-samples audio packets (e.g., audio packets 1007, as shown in FIG. 10) based on clock scaling factor 1213 to generate re-sampled audio packets 1215. Adjustment logic 1214 may implement fractional sampling techniques to re-sample the received audio packets. Playback of re-sampled audio packets 1215 may be based on receiver clock signal 1203.

III. Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, infrared and other wireless media. Example embodiments are also directed to such communication media.

The latency reduction and clock/speaker synchronization embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 13:
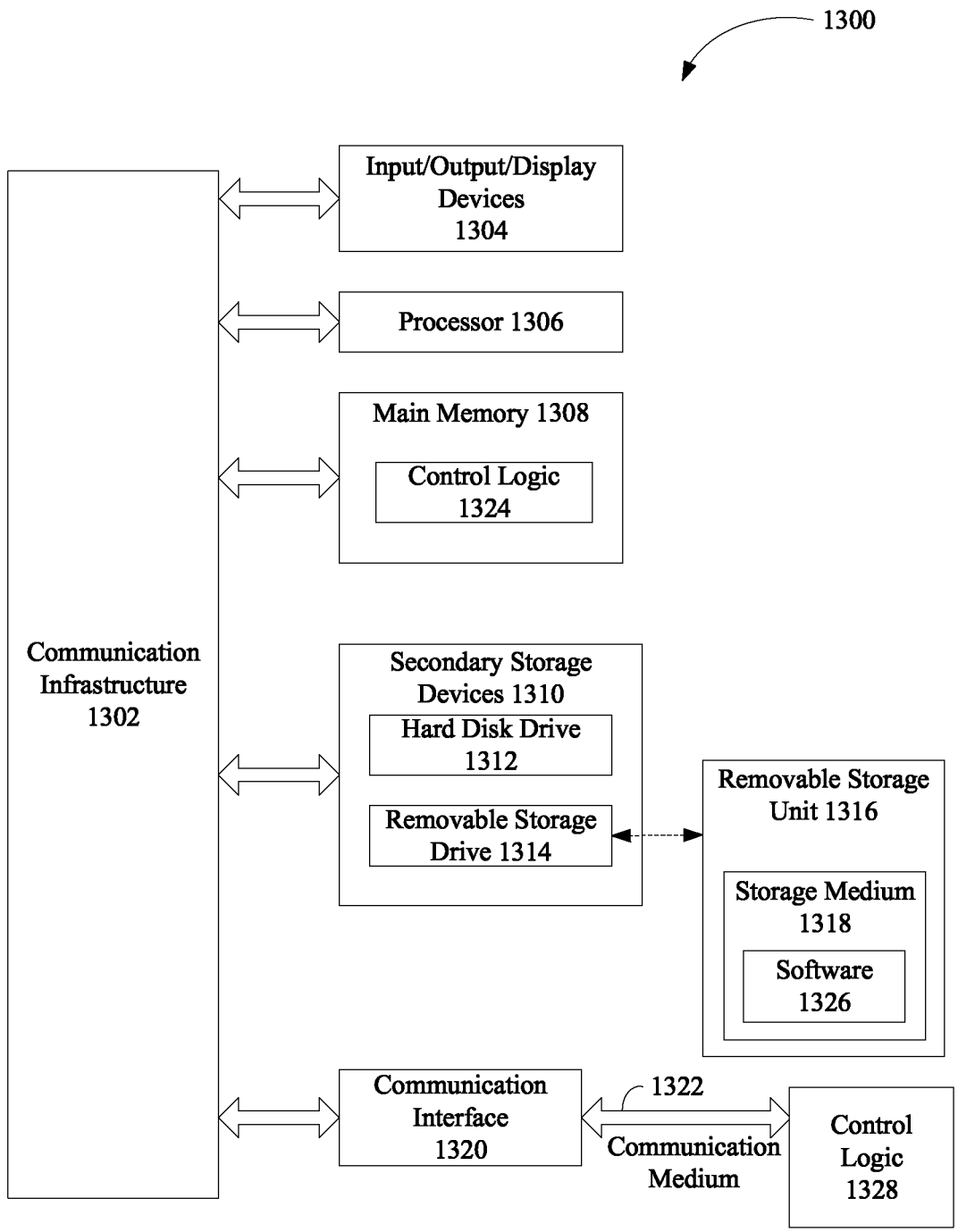
FIG. 13 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1300 shown in FIG. 13. It should be noted that computer 1300 may represent communication devices, processing devices, servers, and/or traditional computers in one or more embodiments. For example, source device 102, source device 302, source device 502, source device 702 and source device 802 (as described above in reference to FIGS. 1, 3, 5, 7 and 8, respectively), sink devices 104A-104E, sink device 304, sink device 704, sink devices 804A-804E, sink device 1004 and sink device 1204 (as described above in reference to FIGS. 1, 3, 7, 8, 10 and 12, respectively), any of the sub-systems, components or sub-components respectively contained therein, may be implemented using one or more computers 1300.

Computer 1300 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 1300 may be any type of computer, including a desktop computer, a server, etc.

Computer 1300 includes one or more processors (also called central processing units, or CPUs), such as a processor 1306. Processor 1308 is connected to a communication infrastructure 1302, such as a communication bus. In some embodiments, processor 1306 can simultaneously operate multiple computing threads.

Computer 1300 also includes a primary or main memory 1308, such as random access memory (RAM). Main memory 908 has stored therein control logic 1324 (computer software), and data.

Computer 1300 also includes one or more secondary storage devices 1310. Secondary storage devices 1310 include, for example, a hard disk drive 1312 and/or a removable storage device or drive 1314, as well as other types of storage devices, such as memory cards and memory sticks. For instance, computer 1300 may include an industry standard interface, such a universal serial bus (USB) interface for interfacing with devices such as a memory stick. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1318 having stored therein computer software 1326 (control logic) and/or data. Removable storage unit 1316 represents a floppy disk, magnetic tape, compact disk, DVD, optical storage disk, or any other computer data storage device. Removable storage drive 1314 reads from and/or writes to removable storage unit 1316 in a well-known manner.

Computer 1300 also includes input/output/display devices 1304, such as touchscreens, LED and LCD displays, monitors, keyboards, pointing devices, etc.

Computer 1300 further includes a communication or network interface 1318. Communication interface 1320 enables computer 1300 to communicate with remote devices. For example, communication interface 1320 allows computer 1300 to communicate over communication networks or mediums 1322 (representing a form of a computer useable or readable medium), such as LANs, WANs, the Internet, etc. Network interface 1320 may interface with remote sites or networks via wired or wireless connections.

Control logic 1328 may be transmitted to and from computer 1300 via the communication medium 1322.

Any apparatus or manufacture comprising a computer useable or readable medium having control logic (software) stored therein is referred to herein as a computer program product or program storage device. This includes, but is not limited to, computer 1300, main memory 1308, secondary storage devices 1310, and removable storage unit 1316. Such computer program products, having control logic stored therein that, when executed by one or more data processing devices, cause such data processing devices to operate as described herein, represent embodiments of the invention.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method for synchronizing playback of audio packets by a plurality of sink devices, comprising:
for each of the plurality of sink devices:
receiving a beacon signal from a source device, the beacon signal including timing information and a first timing parameter;
determining a second timing parameter based on a combination of the timing information and a receiver clock signal used to playback the received audio packets by the sink device; and
adjusting playback of received audio packets from the source device based on the second timing parameter and the first timing parameter.

2. The method of claim 1, further comprising:
generating a clock scaling factor based on first timing parameter and the second timing parameter.

3. The method of claim 2, wherein said adjusting comprises:
adjusting the receiver clock signal based on the clock scaling factor to adjust playback of the received audio packets.

4. The method of claim 2, wherein said adjusting comprises:
re-sampling the received audio packets to match a clock rate of the receiver clock signal based on the clock scaling factor to adjust playback of the received audio packets.

5. The method of claim 1, wherein the first timing parameter is based on the timing information and a transmitter clock signal implemented by the source device and that is indicative of when the audio packets are to be played back by the plurality of sink devices.

6. The method of claim 1, wherein said determining the second timing parameter based on the combination of the timing information and the receiver clock signal comprises:
dividing the receiver clock signal by a value of the timing information to determine the second timing parameter.

7. The method of claim 1, wherein said determining the second timing parameter based on the combination of the timing information and the receiver clock signal comprises:
subtracting a value of the timing information from the receiver clock signal to determine the second timing parameter.

8. A sink device, comprising:
one or more processors; and
a memory that stores program code configured to be executed by the one or more processors, the program code comprising:
parameter determination logic configured to receive a beacon signal from a source device, the beacon signal including timing information and a first timing parameter;
clock scaling factor determination logic configured to determine a second timing parameter based on a combination of the timing information and a receiver clock signal used to playback the received audio packets by the sink device; and
adjustment logic configured to adjust playback of received audio packets from the source device based on the second timing parameter and the first timing parameter.

9. The sink device of claim 8, wherein the clock scaling factor determination logic is further configured to:
generate a clock scaling factor based on first timing parameter and the second timing parameter.

10. The sink device of claim 9, wherein the adjustment logic is configured to:
adjust the receiver clock signal based on the clock scaling factor to adjust playback of the received audio packets.

11. The sink device of claim 9, wherein the adjustment logic is configured to:
re-sample the received audio packets to match a clock rate of the receiver clock signal based on the clock scaling factor to adjust playback of the received audio packets.

12. The sink device of claim 8, wherein the first timing parameter is based on the timing information and a transmitter clock signal implemented by the source device and that is indicative of when the audio packets are to be played back by the sink device.

13. The sink device of claim 8, wherein the clock scaling factor determination logic is configured to:
divide the receiver clock signal by a value of the timing information to determine the second timing parameter.

14. The sink device of claim 8, wherein the clock scaling factor determination logic is configured to:
subtract a value of the timing information from the receiver clock signal to determine the second timing parameter.

15. A non-transitory computer-readable storage medium having program instructions recorded thereon that, when executed by at least one processor of a sink device, perform a method, the method comprising:
receiving a beacon signal from a source device, the beacon signal including timing information and a first timing parameter;

determining a second timing parameter based on a combination of the timing information and a receiver clock signal used to playback the received audio packets by the sink device; and adjusting playback of received audio packets from the source device based on the second timing parameter and the first timing parameter.

16. The non-transitory computer-readable storage medium of claim 15, the method further comprising:

generating a clock scaling factor based on first timing parameter and the second timing parameter.

17. The non-transitory computer-readable storage medium of claim 16, wherein said adjusting comprises:

adjusting the receiver clock signal based on the clock scaling factor to adjust playback of the received audio packets.

18. The non-transitory computer-readable storage medium of claim 16, wherein said adjusting comprises:

re-sampling the received audio packets to match a clock rate of the receiver clock signal based on the clock scaling factor to adjust playback of the received audio packets.

19. The non-transitory computer-readable storage medium of claim 15, wherein the first timing parameter is based on the timing information and a transmitter clock signal implemented by the source device and that is indicative of when the audio packets are to be played back by the sink device.

20. The non-transitory computer-readable storage medium of claim 15, wherein determining the second timing parameter based on the combination of the timing information and the receiver clock signal comprises:

dividing the receiver clock signal by a value of the timing information to determine the second timing parameter.

* * * * *